3,404,120
POLYMER COMPOSITIONS CONTAINING COAL WHICH HAS BEEN GROUND IN A NON-OXIDIZING ATMOSPHERE
William W. Gotshall, Orchard Lake, Mich., assignor to Marathon Oil Company, Findlay, Ohio, a corporation of Ohio
No Drawing. Filed Aug. 2, 1965, Ser. No. 476,747
10 Claims. (Cl. 260—41.5)

ABSTRACT OF THE DISCLOSURE

The present invention comprises polymeric compositions containing above about 10 parts by weight of ground coal per 100 parts by weight of the polymer, said ground coal having an average particle size of from about 1 to 2.5 microns and having less than 10% particles greater than 5 microns, said coal having been ground in a non-oxidizing atmosphere.

---

The present invention relates to polymeric compositions and in particular relates to polymeric compositions which have been filled with substantial quantities of particles of coal ground under special conditions. The application also relates to such specially ground coals and methods for their production.

Carbon has long found widespread uses as a filler in plastics and particularly in rubber compositions. Because they permit the attainment of high tensile strengths, carbon blacks have been preferred fillers and additives in such compositions. However, because carbon blacks are relatively expensive fillers, Austin Blacks, produced by the grinding of metallurgical coke have sometimes been utilized as fillers and extenders. Austin and related blacks have in general been used in low-cost rubber products because polymeric compositions containing them generally have inferior properties as compared to similar compositions filled with carbon blacks.

The present invention permits the utilization of extremely low-cost raw materials for the preparation of fillers and extenders suitable for the production of polymeric compositions having properties superior to similar compositions containing Austin or similar conventional ground blacks.

According to the process of the present invention, specially prepared coal is employed as a filler and extender in polymeric compositions. The new forms of coal of the present invention preferably have an average particle size of from 1 to about 2.5 microns with less than 10% of the particles larger than 5 microns.

The new forms of coal are in general formed by grinding, that is, comminuting, conventional coals preferably in autogenous grinding mills, and especially in fluid energy mills of the type commonly referred to as "hurricane mills." According to the process of the present invention, the grinding is carried out under nonoxidizing conditions and air and free oxygen are excluded from the mills in which the grinding occurs. Thus, the present invention embodies the discovery that oxidizing agents have a deleterious effect on ground coals which are intended for use in rubber or other polymeric materials.

While it is not intended that the invention be restricted by any mechanism hypothesized herein, it appears that autogenous grinding of cokes produces particles having a high reactivity, possibly because of severing of bonds which may occur during the grinding process. Such severed bonds can react with the oxygen in the air and thereby lose their reactivity, or, if properly protected as taught herein, they may be utilized to react with other ingredients in polymeric materials and produce polymers and especially rubbers having the excellent physical properties.

In addition to their substantial economic advantages, the preferred forms of coals of the present invention exceed by a substantial margin the American Society for Testing Materials' specifications for "non-staining blacks."

In a preferred embodiment of the present invention, anthracite coal is first ground to an average particle size diameter of approximately 50 microns in a conventional rotary mill. Oxidation at this point is not especially critical because of the relatively small amount of exposed surface area in the coarse ground particles.

The coarse particles are then fed to a Model No. 30–10 mill manufactured by Majac, Incorporated, of Sharpsburg, Pa. Steam is preferably utilized as the grinding fluid and a velocity which is approximately sonic at 700 to 800° F. and 100 to 150 p.s.i.g. nozzle is maintained throughout the grinding section of the mill. The classifier of the mill is operated to separate out about 5 micron or smaller particles and grinding is continued until the size distribution of the particles is as follows: 99% less than 5 microns; 50% less than 1.5 microns; 10% less than 0.5 micron. (All percentages in the present application are percent by weight unless otherwise specified.)

Care is taken to exclude oxygen, and the water from which the steam is prepared is preferably de-aerated prior to entering the steam boilers. The entire apparatus is lagged with 2 inches of insulation in order to minimize condensation on the walls of the mill.

While in the classifier, the product is sprayed with approximately 0.1 to 1.0% based on the weight of the product of zinc stearate. In order to prevent the deleterious effect caused by oxygen contact, the particles are individually coated with zinc stearate until a relatively uniform coating is obtained.

When the coated product prepared as described above is utilized in rubber compositions containing approximately 65 parts of the new product per 100 parts of rubber, the coating material melts during the normal milling and vulcanizing processes which are performed conventionally. The resulting rubber composition is found to have a tensile strength comparable to the average tensile strength obtained when utilizing conventional thermal blacks and has significantly superior modulus and set.

While hard coals, especially anthracites, are preferred for the practice of the present invention, any coal which is sufficiently strong to be ground to the above particle size distribution may be employed. In general, it is preferred that the coals contain from about 5.0 to about 30% volatiles as measured according to ASTM test D–271–58.

For significant results, the polymeric compositions should contain above about 10 parts by weight of the new forms of coal of the present invention for each 100 parts of elastomer contained in the formulation. For most purposes from 60 to about 75 parts of the coal of the present invention will be most preferred for each 100 parts of elastomer.

In general, as small a particle size as possible will be preferred in the product from the fluid grinding step, but average particle sizes of not more than about 2.5 microns will be preferred and the preferred size distribution will be at least 90% less than 5 microns in size. The particle size will in all cases represent the average diameter of the individual particles after grinding. For reasons of economy, average diameters of about 1 micron or more will be preferred in order to reduce grinding costs.

The fluid energy mills may operate with a wide variety of inert non-oxidizing atmospheres. By non-oxidizing is meant media which do not react to any substantial degree under the conditions of grinding. In general, the oxidizing agents to be avoided are those commonly thought of as reactive, e.g., oxygen, ozone, ammonia, HCl, nitrogen oxides, etc. Steam is the most preferred grinding media from the standpoint of economy but nitrogen, helium, hydrogen, argon, and a wide variety of other gases commonly thought of as inert or reducing may be utilized. For maximum economy in grinding, gases of lower molecular weights, e.g., hydrogen and steam, will be preferred.

The final grinding will preferably be accomplished in grinding mills of the "hurricane" type. Especially preferred are those autogenous mills manufactured by Majac, Inc., of Sharpsburg, Pa.; the reductionizer manufactured by Reduction Engineering Corporation; and the micronizer manufactured by the Sturtevant Mill Company of Boston, Mass. The mills are preferably operated in a conventional manner according to the manufacturer's recommendations.

The product from the mill can be immediately formulated into compositions to prevent contact with an oxidizing atmosphere. However, in most cases, it will be preferable to coat the coal from the mill with a coating agent as described in the above preferred embodiment. The coating agent should, of course, readily allow dispersion of the ground coal during compounding. The coating agent must also be non-deleterious to the compositions in which the ground coal of the present invention will be employed. A fugitive coating agent which evaporates or melts during processing, as for example, during the vulcanizing of rubber formulations, is particularly desirable. Melting or boiling points of from 70 to about 250° F. are preferred. In addition to the liquids, certain finely divided powders, e.g., zinc stearate, stearic acid, and solid primary amines will act as effective barriers against oxidizing atmospheres. Also, in some instances, pelletizing can serve to protect the major portion of the ground coal from oxidizing atmospheres. Such pellets can be conventionally formed but should be sufficiently weak to disintegrate during normal compounding.

In general, rubber and other polymeric compounds formulated with the new forms of ground coal will have lower densities than comparable formulations with conventional carbon blacks. Since most carbon products are formulated to fill a given volume, this lower density permits lighter fabricated materials and results in a substantial saving in ingredients which are in virtually all cases sold on a weight basis. In most cases, no revision of formulations will be required and weight loadings of the new carbon forms can be reduced by the ratio of their specific gravities to 1.8 (specific gravity of most presently used blacks).

In addition to natural rubber compositions, the compounds of the present invention will also find use as fillers for other elastomers, e.g., SBR (styrene-butadiene copolymer), Buna-n (butadiene-acrylonitrile copolymer), butyl rubber, EPT (ethylene-propylene terpolymer with a third material which is a diolefin, e.g., isoprene), polyisoprenes, chloroprenes, and fluoroprenes. Vulcanizable elastomers are preferred.

An additional advantage in certain specialized applications is that the substitution of the equivalent amounts of the new forms of carbon for the carbon blacks previously used will in most cases increase both the electrical and thermal conductivity of the finished article.

Because of the combination of low set, high modulus, and unusually good non-staining properties of the carbon forms of the present invention, they are especially preferred for the production of tire carcasses. In such applications, their low sets provide low permanent distortion of the rubber, and correspondingly low heat build ups. This high modulus provides excellent shock absorbing qualities. Their non-staining properties are important in preventing the staining of whitewalls which are applied to tire carcasses.

It will be understood that the present invention is adaptable to a wide variety of modifications and variations in addition to those described above and the claims appended hereto are intended to cover all such apparent variations.

What is claimed is:
1. Polymeric compositions containing above about 10 parts by weight of ground coal per 100 parts by weight of resin, said ground coal having an average particle size of from about 1 to 2.5 microns and having less than 10% particles greater than 5 microns, said coal having been ground in a non-oxidizing atmosphere wherein the polymer comprises natural rubber, styrene-butadiene copolymer elastomer, butadiene-acrylonitrile copolymer elastomer, butyl rubber elastomer, ethylene-propylene-diolefin terpolymer elastomer, polyisoprene elastomer, chloroprene elastomer or fluoroprene elastomer.

2. The compositions of claim 1 wherein the coal is anthracite.

3. The compositions of claim 2 wherein the polymeric ingredients comprise natural rubber elastomer.

4. The compositions of claim 2 wherein the polymer comprises styrene-butadiene copolymer elastomer.

5. The compositions of claim 2 wherein the polymer comprises butadiene-acrylonitrile copolymer elastomer.

6. The compositions of claim 2 wherein the polymer comprises butyl rubber elastomer.

7. The compositions of claim 2 wherein the polymer comprises ethylene-propylene-diolefin terpolymer elastomer.

8. The compositions of claim 2 wherein the polymer comprises polyisoprene elastomer.

9. The compositions of claim 2 wherein the polymer comprises chloroprene elastomer.

10. The compositions of claim 2 wherein the polymer comprises fluoroprene elastomer.

References Cited

UNITED STATES PATENTS

| 1,358 | 10/1839 | Chater | 106—307 |
| 42,257 | 4/1864 | Lundgren | 106—307 |

FOREIGN PATENTS

| 108,037 | 8/1939 | Australia. |

ALLAN LIEBERMAN, *Primary Examiner.*

UNITED STATES PATENT OFFICE
CERTIFICATE OF CORRECTION

Patent No. 3,404,120           Dated October 1, 1968

Inventor(s)   William W. Gotshall

It is certified that error appears in the above-identified patent and that said Letters Patent are hereby corrected as shown below:

Col. 1, line 33:   In place of "Blacks" substitute --Black pulverized coal (a trademark of the Slab Fork Coal Company) and fillers--

Col. 1, line 35:   After "Austin" insert --Black--

SIGNED AND SEALED
APR 14 1970

(SEAL)
Attest:
Edward M. Fletcher, Jr.
Attesting Officer

WILLIAM E. SCHUYLER, JR.
Commissioner of Patents